(12) United States Patent
Kitazato et al.

(10) Patent No.: US 9,961,409 B2
(45) Date of Patent: May 1, 2018

(54) RECEPTION DEVICE, RECEPTION METHOD, BROADCASTING DEVICE, BROADCASTING METHOD, AND LINK APPLICATION CONTROL SYSTEM

(71) Applicant: SONY CORPORATION, Tokyo (JP)

(72) Inventors: Naohisa Kitazato, Tokyo (JP); Yoshiharu Dewa, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days. days.

(21) Appl. No.: 14/126,609

(22) PCT Filed: Apr. 9, 2013

(86) PCT No.: PCT/JP2013/060733
§ 371 (c)(1),
(2) Date: Dec. 16, 2013

(87) PCT Pub. No.: WO2013/157446
PCT Pub. Date: Oct. 24, 2013

(65) Prior Publication Data
US 2015/0135207 A1 May 14, 2015

(30) Foreign Application Priority Data
Apr. 19, 2012 (JP) ................ 2012-095498

(51) Int. Cl.
*H04N 7/16* (2011.01)
*H04N 21/485* (2011.01)
(Continued)

(52) U.S. Cl.
CPC ........ *H04N 21/4858* (2013.01); *H04H 60/13* (2013.01); *H04N 7/163* (2013.01);
(Continued)

(58) Field of Classification Search
CPC ............. H04N 21/4858; H04N 7/163; H04N 21/25816; H04N 21/25825; H04N 21/431;
(Continued)

(56) References Cited

U.S. PATENT DOCUMENTS 7,716,713 B1  5/2010  Ryu et al.
2003/0084324 A1*  5/2003  Koved .............. G06F 21/53
726/6
(Continued)

FOREIGN PATENT DOCUMENTS

JP  2006-50237 A  2/2006
JP  2009-076087 A  4/2009
(Continued)

OTHER PUBLICATIONS

ETSI TS 102 796 V1.1.1, Hybrid Broadcast Broadband TV, Jun. 2010, ETSI, pp. 1-75.*
(Continued)

*Primary Examiner* — Nathan Flynn
*Assistant Examiner* — Alfonso Castro
(74) *Attorney, Agent, or Firm* — Chip Law Group

(57) ABSTRACT

There is provided a reception device configured to receive content broadcast via a broadcasting network, the reception device including an application execution unit configured to execute a link application that is able to change a layout of a screen with reference to a video of the received content, and an application control unit configured to control the application execution unit based on application control information relating to the link application so that activation of the link application is restricted.

16 Claims, 10 Drawing Sheets

(51) Int. Cl.
H04N 21/431 (2011.01)
H04N 21/6543 (2011.01)
H04H 60/13 (2008.01)
H04N 21/258 (2011.01)
H04N 21/6547 (2011.01)
H04N 21/81 (2011.01)
H04N 21/858 (2011.01)
H04N 21/236 (2011.01)
G06F 9/445 (2018.01)

(52) U.S. Cl.
CPC ..... *H04N 21/236* (2013.01); *H04N 21/25816* (2013.01); *H04N 21/25825* (2013.01); *H04N 21/431* (2013.01); *H04N 21/4316* (2013.01); *H04N 21/6543* (2013.01); *H04N 21/6547* (2013.01); *H04N 21/8173* (2013.01); *H04N 21/858* (2013.01); *G06F 9/445* (2013.01)

(58) Field of Classification Search
CPC ........... H04N 21/6543; H04N 21/6547; H04N 21/8173; H04N 21/858; H04H 60/13; G06F 9/445
USPC ......................................................... 725/25
See application file for complete search history.

(56) References Cited

U.S. PATENT DOCUMENTS

| | | | | |
|---|---|---|---|---|
| 2006/0095952 | A1* | 5/2006 | Chung | H04N 21/235 725/136 |
| 2011/0182562 | A1* | 7/2011 | Iwakiri et al. | 386/248 |
| 2013/0303077 | A1* | 11/2013 | Ohmata | H04H 20/59 455/3.01 |

FOREIGN PATENT DOCUMENTS

| | | | |
|---|---|---|---|
| JP | 2009-147808 | A | 7/2009 |
| JP | 2010-004498 | A | 1/2010 |
| JP | 2011-155317 | A | 8/2011 |
| JP | 2012-257230 | A | 12/2012 |
| JP | 2015-159577 | A | 9/2015 |
| WO | 2005/104539 | A | 11/2005 |
| WO | 2005/104539 | A1 | 11/2005 |
| WO | WO 2012/157767 | A1 | 11/2012 |
| WO | JPWO2013157446 | A1 | 12/2015 |

OTHER PUBLICATIONS

OIPF Release 2 Specification, vol. 5—Declarative Application Environment, [V2.1]—[Jun. 21, 2011], pp. 1-109.*
ETSI TS 102 809 V1.1.1 (Jan. 2010), Digital Video Broadcasting (DVB); Signalling and carriage of interactive applications and services in Hybrid broadcast/broadband environments, ETSI, pp. 1-98.*
OIPF, Release 2 Specification vol. 5—Declarative Application Environment [V2.1], Open IPTV Forum, Jun. 21, 2011, pp. 1-369.*
Japanese Office Action dated Nov. 11, 2014 in Patent Application No. 2013-516822 (with English Translation).
Kazuhiro Otsuki et al., "A Method of Controlling Presentation for Applications in Hybridcast", Technical Report of the Institute of Image Information and Television Engineers, Feb. 9, 2012, vol. 36, No. 7, pp. 29-32 and Cover pages (with English Abstract).
Japanese Office Action dated Mar. 27, 2014 in Patent Application No. 2013-516822 with English Translation.
International Search Report dated Jul. 16, 2013 in PCT/JP2013/060733.
Kazuhiro Otsuki, et al. "A Method of Controlling Presentation for Application in Hybridcast", ITE Technical Report, vol. 36, No. 7, Feb. 9, 2012, pp. 29-32.
Ohmata, et al., An Access Control Method for Web Application on Hybridcast, Proceedings of the 2012 Institute of Electronics, Information and Communication Engineers General Conference—Communications 2, Mar. 6, 2012, p. 195, JP.
Ohtsuki, et al., A Method of Controlling Presentation for Applications in Hybridcast, Institute of Image Information and Television Engineers Technical Report, the Institute of Image Information and Television Engineers, Feb. 9, 2012, vol. 36 No. 7, pp. 29-32, JP (with English Abstract).
"Digital Video Broadcasting (DVB); Signalling and carriage of interactive applications and services in Hybrid broadcast/broadband environments", ETSI TS 102 809 V1.1.1 (Jan. 2010), Jan. 2010, p. 44, URL, http://www.etsi.org/deliver/etsi_ts/102800_102899/102809/01.01.01_60/ts_102809v010101p.pdf.
Japanese Office Action dated Jan. 20, 2015 in patent application No. 2014-256234.
Japanese Office Action dated Jan. 20, 2015 in patent application No. 2014-256235.
Japanese Office Action dated Jan. 20, 2015 in patent application No. 2014-256236.
Extended European Search Report dated Jul. 8, 2015 in patent application No. 13778414.6.
"Hybrid Broadcast Broadband TV", Technical Specification, European Telecommunications Standards Institute (ETSI), 650, Route Des Lucioles ; F-06921 Sophia-Antipolis ; France, vol. Broadcas, No. VI.1.1, Jun. 1, 2010 (Jun. 1, 2010), XP014047139.
Office Action Received for Japanese Patent Application No. 2015-076730, dated Jan. 26, 2016, 10 Pages of Office Action Including 5 Pages of English Translation.
Office Action for EP Patent Application No. 13778414.6, dated Apr. 5, 2017, 6 pages.
"Digital Video Broadcasting (DVB); Signalling and Carriage of Interactive Applications and Services in Hybrid Broadcast/Broadband Environments", ETSI TS 102 809 v1.1.1, Jan. 2010, pp. 1-98.
Office Action for JP Patent Application No. 2016-185345, dated Aug. 31, 2017, 5 pages of Office Action and 5 pages of English Translation.
"Digital Video Broadcasting (DVB); Signalling and carriage of Interactive applications and services in Hybrid broadcast/broadband environments", ETSI TS 102 809 V1.1.1, Jan. 2010, 2 pages.

* cited by examiner

FIG. 6

| | TITLE OF ITEM | ESSENTIAL OR OPTIONAL | DESCRIPTION |
|---|---|---|---|
| 51 | APPLICATION TYPE | ESSENTIAL | FIXING APPLICATION TYPE TO ONE IN HTML5 |
| 52 | PROVIDER ID | ESSENTIAL | APPLICATION PROVIDER |
| 53 | APPLICATION ID | ESSENTIAL | UNIQUE APPLICATION IDENTIFIER OF SPECIFIC PROVIDER |
| 54 | APPLICATION CONTROL COMMAND | ESSENTIAL | CONTROL ACTION TOWARD TARGET APPLICATION AUTOMATIC ACTIVATION PREFETCHING CLOSING OPERABLE |
| 55 | APPLICATION SPECIFICATION VERSION | ESSENTIAL | VERSION NUMBER OF EACH APPLICATION TYPE |
| 56 | RECEPTION DEVICE REQUIRED FUNCTION PROFILE | OPTIONAL (BUT CAN BE SET AS DEFAULT) | PROFILE VALUE INDICATING FUNCTION OF RECEPTION DEVICE THAT APPLICATION REQUIRES |
| 57 | APPLICATION URL | OPTIONAL (OR ESSENTIAL ACCORDING TO COMMAND) | URL FOR APPLICATION ACQUISITION |
| 58 | APPLICATION BOUNDARY | OPTIONAL (OR ESSENTIAL ACCORDING TO COMMAND) | OPERATION RANGE OF APPLICATION |
| 59 | APPLICATION SYSTEM PRIORITY | OPTIONAL (BUT CAN BE SET AS DEFAULT) | PRIORITY BETWEEN OTHER APPLICATION TYPE (INCLUDING EXISTING DATA BROADCASTING) THAT AUTOMATICALLY STARTS |
| 60 | APPLICATION BROADCASTING LINK RANGE | OPTIONAL (OR ESSENTIAL ACCORDING TO COMMAND) | LINK OPERATION RANGE OF APPLICATION Service_bound/Provider_bound/U_bound |
| 61 | PERMISSION INFORMATION | OPTIONAL | BROADCASTING-RELATED FUNCTION PERMITTED TO APPLICATION |
| 62 | SERVER ACCESS DISTRIBUTION PARAMETER | OPTIONAL | CONTROL PARAMETER FOR DISTRIBUTING ACCESS TO SERVER |

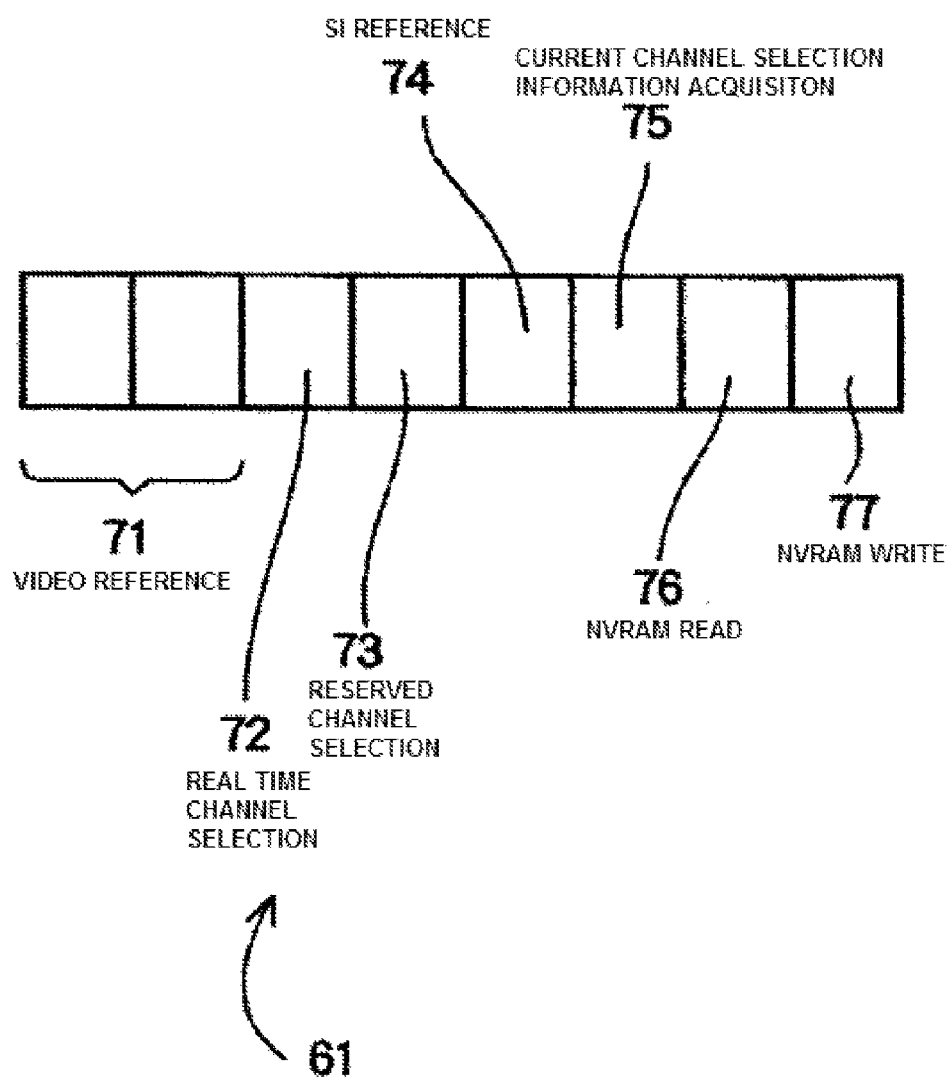

FIG. 8 71

| VIDEO REFERENCE | PERMITTED RANGE OF BROADCASTING-ORIENTED LINK APP | PERMITTED RANGE OF NON-BROADCASTING-ORIENTED LINK APP | LAYOUT |
|---|---|---|---|
| 00 | (NO PERMISSION IN THIS STATE) | REFERRING TO BROADCASTING NOT PERMITTED | NO DISPLAY |
| 01 | ENTIRE BROADCAST SCREEN BUT NO APP DISPLAY | ENTIRE BROADCAST SCREEN BUT NO APP DISPLAY, OR NO REFERENCE TO BROADCAST | PROGRAM |
| 10 | REFER TO SLAVE SCREEN OF BROADCAST | REFER TO SLAVE SCREEN OF BROADCAST, OR NO REFERENCE TO BROADCAST | PROGRAM / APP |
| 11 | OVERLAY AND USING SLAVE SCREEN DISPLAY POSSIBLE | OVERLAY, SLAVE SCREEN DISPLAY, OR NO REFERENCE TO SLAVE SCREEN OF BROADCAST | APP PROGRAM / APP PROGRAM |

… (1) …

RECEPTION DEVICE, RECEPTION METHOD, BROADCASTING DEVICE, BROADCASTING METHOD, AND LINK APPLICATION CONTROL SYSTEM

TECHNICAL FIELD

The present disclosure relates to a reception device, a reception method, a broadcasting device, a broadcasting method, a program, and a link application control system, and particularly to a reception device, a reception method, a broadcasting device, a broadcasting method, a program, and a link application control system that are appropriate for causing a predetermined application program to operate in linkage with a television program.

BACKGROUND ART

In digital television broadcasting, not only a broadcasting service for television programs (hereinafter abbreviated as "program"), but also a service which is so-called data broadcasting has been performed (for example, refer to Patent Literature 1). In addition, by using the data broadcasting, supplying a predetermined application program (hereinafter, appropriately abbreviated as "application" or "app") to a reception side in linkage with a program so as to be executed has also been realized.

In the related art, an application that is linked with a program (hereinafter referred to as a link application or abbreviated as "link app") is supplied to a reception device together with a program created by a broadcasting station that broadcasts programs. However, in the future, a service operation form in which a general app provider with no relation to programs creates a link app and supplies the app to a reception device using any method to cause the app to be executed is expected.

CITATION LIST

Patent Literature

Patent Literature 1: JP 2006-50237A

SUMMARY OF INVENTION

Technical Problem

However, such a link app can decide a layout of a screen output by a reception device, refer to metadata of programs, or control operations (for example, selecting channels, or the like) relating to reception of the reception device (the operations are collectively referred to as a reception device control function).

Accordingly, when a general app provider creates a link app with a certain intention or a link app malfunctions due to a bug, a problem that a video or sound of a program is not output or information disparaging a program is displayed on the program can occur when the reception device control function described above is abused.

Thus, in order to be able to prevent such a problem described above when creation of link apps is permitted to general app providers, it is desirable to design the reception device control function of link apps to be controlled on a broadcasting side.

It is desirable to provide a structure in which the reception device control function of link apps can be controlled on a broadcasting side.

Solution to Problem

According to a first embodiment of the present disclosure, there is provided a reception device configured to receive content broadcast via a broadcasting network, the reception device including an application execution unit configured to execute a link application that is able to change a layout of a screen with reference to a video of the received content, and an application control unit configured to control the application execution unit based on application control information relating to the link application so that activation of the link application is restricted.

The application control unit may analyze an operation of the link application that is not yet activated by the application execution unit, controls the application execution unit based on a comparison of the operation to permission information included in the application control information, and restricts activation of the link application.

The application control unit may acquire the application control information being broadcast, or acquires the application control information from a predetermined server.

The permission information may include an item of video reference indicating a range of permitting changing of a layout of a screen with reference to a video of the received content.

The permission information may further include at least one of an item relating to real-time channel selection, an item relating to reserved channel selection, an item relating to SI reference, an item relating to current channel selection information acquisition, an item relating to NVRAM Read, and an item relating to NVRAM Write.

According to the first embodiment of the present disclosure, there is provided a reception method performed by a reception device configured to receive content broadcast via a broadcasting network, the method including acquiring application control information relating to a link application that is able to change a layout of a screen with reference to a video of the received content, and controlling an application by restricting activation of the link application based on the acquired application control information.

According to the first embodiment of the present disclosure, there is provided a program for causing a computer that receives content broadcast via a broadcasting network, to function as an application execution unit configured to execute a link application that is able to change a layout of a screen with reference to a video of the received content, and an application control unit configured to control the application execution unit based on application control information relating to the link application so that activation of the link application is restricted.

According to the first embodiment of the present disclosure, the application control information relating to the link application that can change the layout of the screen with reference to the video of the received content is acquired, and based on the acquired application control information, activation of the link application is restricted.

According to a second embodiment of the present disclosure, there is provided a broadcasting device configured to broadcast content via a broadcasting network, the broadcasting device including a supply unit configured to supply, to a reception device, application control information relating to a link application that is able to be executed together with reception of the content by the reception device. The application control information includes permission information that at least includes an item of video reference that indicates a range of permitting the link application to change a layout of a screen with reference to a video of the received content.

The permission information may further include at least one of an item relating to real-time channel selection, an item relating to reserved channel selection, an item relating to SI reference, an item relating to current channel selection information acquisition, an item relating to NVRAM Read, and an item relating to NVRAM Write.

According to the second embodiment of the present disclosure, there is provided a broadcasting method performed by a broadcasting device that broadcasts content via a broadcasting network, the method including supplying, to a reception device, application control information relating to a link application that is able to be executed together with reception of the content by the reception device. The application control information includes permission information that at least includes an item of video reference that indicates a range of permitting the link application to change a layout of a screen with reference to a video of the received content.

According to the second embodiment of the present disclosure, there is provided a program for causing a computer that broadcasts content via a broadcasting network, to function as a supply unit configured to supply, to a reception device, application control information relating to a link application that is able to be executed together with reception of the content by the reception device. The application control information includes permission information that at least includes an item of video reference that indicates a range of permitting the link application to change a layout of a screen with reference to a video of the received content.

According to the second embodiment of the present disclosure, the application control information relating to the link application that can be executed together with the reception of the content by the reception device is supplied to the reception device.

According to a third embodiment of the present disclosure, there is provided a link application control system composed of a broadcasting device that broadcasts content via a broadcasting network and a reception device that receives the broadcast content. The broadcasting device includes a supply unit configured to supply, to a reception device, application control information relating to a link application that is able to be executed together with reception of the content by the reception device. The reception device includes an application execution unit configured to execute a link application that is able to change a layout of a screen with reference to a video of the received content, and an application control unit configured to control the application execution unit based on the application control information so that activation of the link application is restricted.

According to the third embodiment of the present disclosure, the broadcasting device supplies, to the reception device, the application control information relating to the link application that can be executed together with the reception of the content by the reception device. On the other hand, the reception device acquires the application control information, and based on the acquired application control information, the activation of the link application is restricted.

Advantageous Effects of Invention

According to the first embodiment of the present disclosure, based on the application control information, the activation of the link application can be restricted.

According to the second embodiment of the present disclosure, the activation of the link application in the reception device can be restricted with supply of the application control information.

According to the third embodiment of the present disclosure, the activation of the link application in the reception device can be restricted using the application control information supplied by the broadcasting device.

BRIEF DESCRIPTION OF DRAWINGS

FIG. 6 is a table for describing items of application control information.

FIG. 7 is a diagram illustrating a bitmap of permission information.

FIG. 8 is a table for describing video reference of the permission information.

DESCRIPTION OF EMBODIMENT

Hereinafter, a preferred embodiment (hereinafter, referred to as an embodiment) of the present disclosure will be described in detail with reference to the appended drawings.

1. Embodiment

Regarding a Configuration Example of a Link Application Control System

Figure 1:
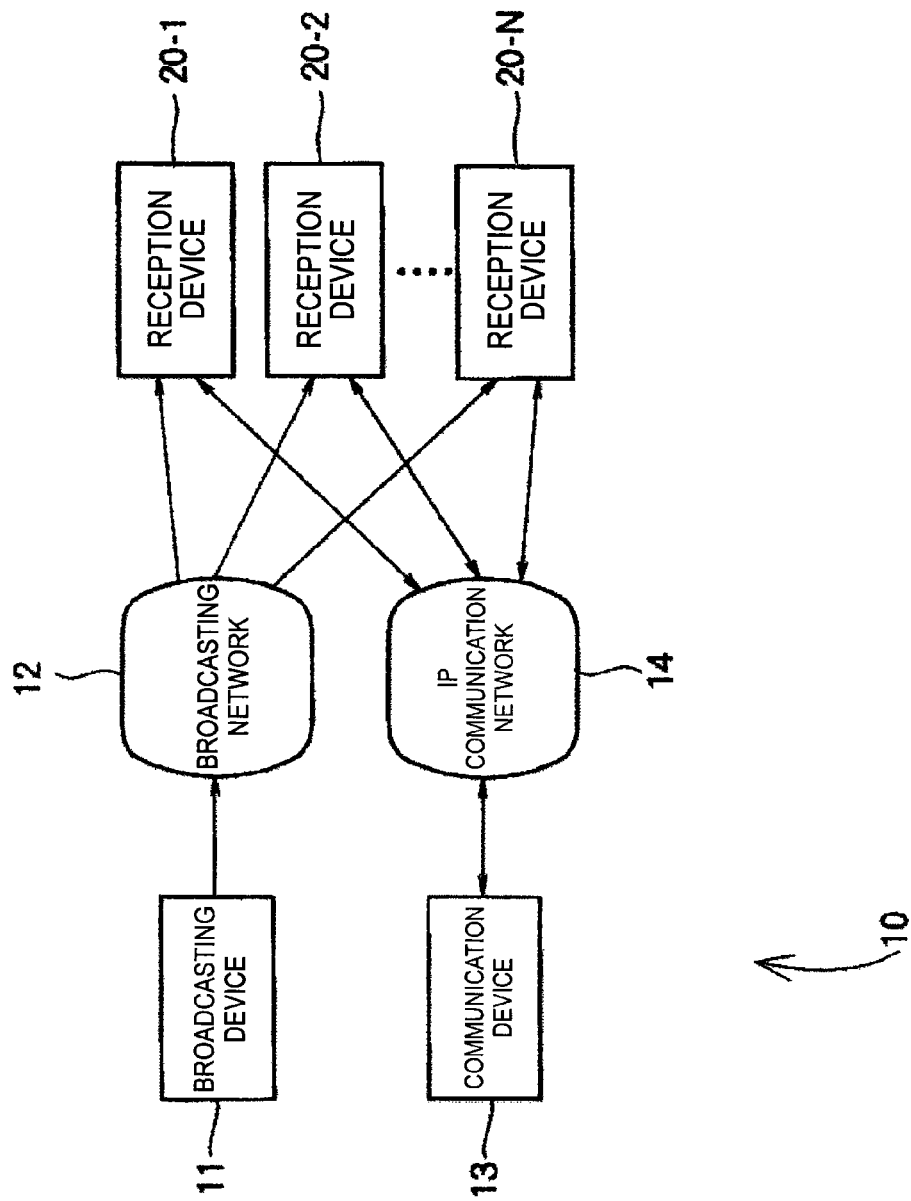
FIG. 1 is a block diagram illustrating a configuration example of a link application control system to which the present disclosure is applied.

FIG. 1 illustrates a link application control system according to an embodiment of the present disclosure. The link application control system 10 is a system that causes a link application to be executed in linkage with a program received by and displayed on a reception side.

The link application control system 10 is configured to include a broadcasting device 11, a communication device 13, and reception devices 20-1 to 20-N. Hereinafter, when it is not necessary to distinguish the reception devices 20-1 to 20-N individually, they are simply referred to as the reception device 20.

The broadcasting device 11 broadcasts broadcasting signals (broadcasting streams) of television broadcasting via a broadcasting network 12 such as a digital terrestrial broadcasting network, a satellite broadcasting network, or a cable television network. The broadcasting streams include signals of videos, sound, subtitles, and the like of a program and signals for data broadcasting service. Further, the broadcasting streams include application control information that includes information serving as a trigger of activation and closing of a link app, and event messages including information that triggers an event in an executed link app, data used in an event, and the like, if necessary.

The communication device 13 is connected to an IP communication network 14 that is represented by the Internet, and supplies link apps in response to requests from the reception device 20 that accesses the communication device via the IP communication network 14. Note that a link app may be set to be supplied to the reception device 20 using data broadcast signals of broadcasting streams. The application control information and the event messages described above may be set to be supplied to the reception device 20 via the IP communication network 14.

The reception device 20 receives broadcasting streams broadcast by the broadcasting device 11 via the broadcasting network 12 and output programs and videos and sound of a commercial to a monitor (not shown) provided in a later stage. In addition, the reception device 20 acquires and executes a link app from the communication device 13 via the IP communication network 14.

The reception device 20 may be configured as a single body, or may be built in, for example, a digital television receiver set, a video recorder, a personal computer, a smartphone, or the like.

[Configuration Example of the Reception Device 20]

Figure 2:
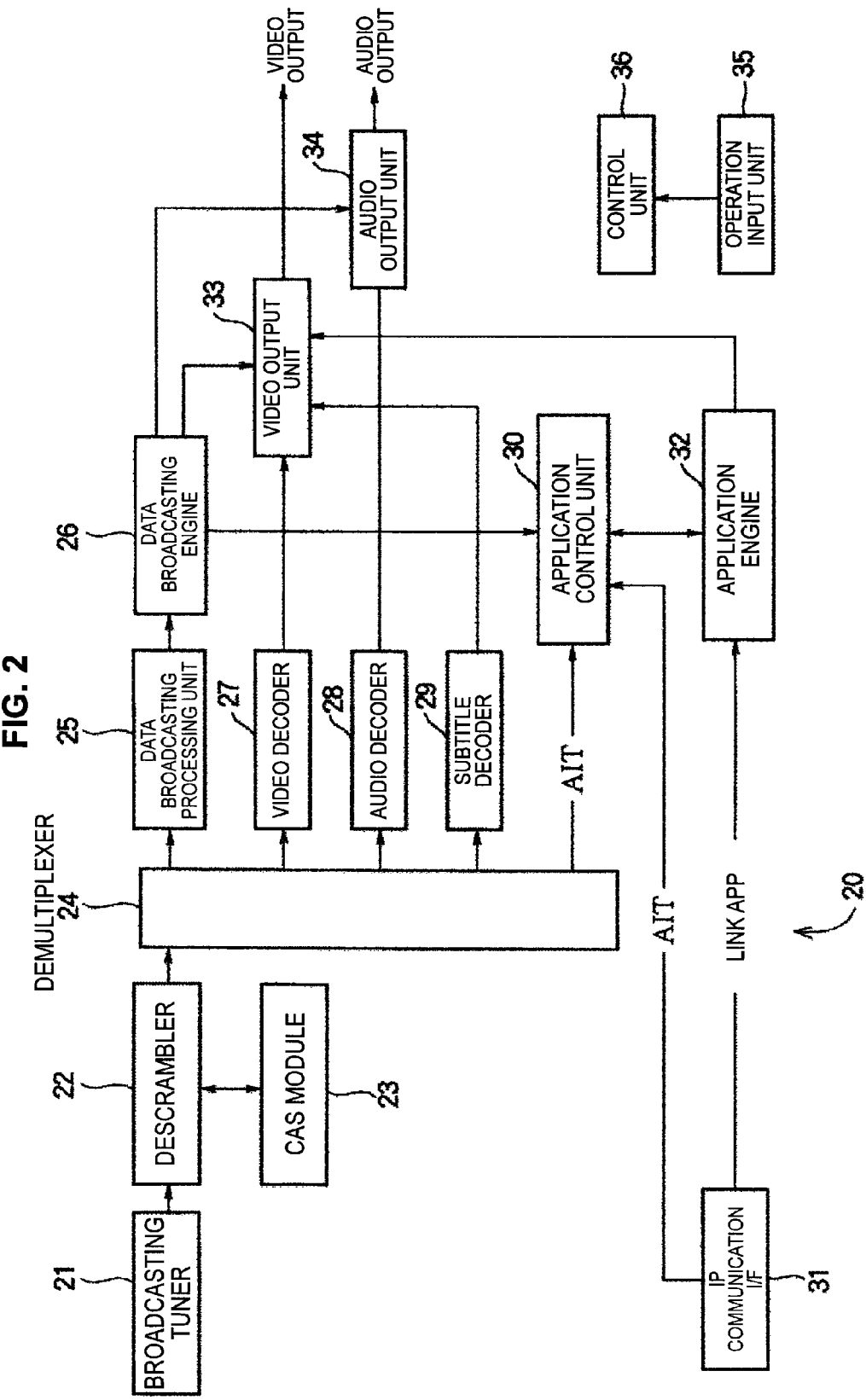
FIG. 2 is a block diagram illustrating a configuration example of a reception device of FIG. 1.

Next, FIG. 2 illustrates a configuration example of the reception device 20.

The reception device 20 has a broadcasting tuner 21, a descrambler 22, a CAS module 23, a demultiplexer 24, a data broadcasting processing unit 25, a data broadcasting engine 26, a video decoder 27, an audio decoder 28, and a subtitle decoder 29 as a television broadcasting reception system. Furthermore, the reception device 20 has an application control unit 30, an IP communication I/F 31, and an application engine 32 as a link app control system. Further, the reception device 20 has a video output unit 33, an audio output unit 34, an operation input unit 35, and a control unit 36 as an input-output system.

The broadcasting tuner 21 receives and demodulates a frequency component according to channel selection from a broadcast television signal, and then outputs a broadcasting stream which is obtained from the result to the descrambler 22. When the broadcasting stream is scrambled, the descrambler 22 descrambles the stream using a key obtained from the CAS (Conditional Access System) module 23 and outputs the result to the demultiplexer 234. The CAS module 23 acquires the key for descrambling from a B-CAS card, or the like.

The demultiplexer 24 separates a digital broadcasting signal from the broadcasting stream and then outputs extracted data to the data broadcasting processing unit 25. In addition, the demultiplexer 24 separates and extracts encoded video data, encoded audio data, and encoded subtitle data from the broadcasting stream, and then outputs the data respectively to the video decoder 27, the audio decoder 28, and the subtitle decoder 29. Furthermore, the demultiplexer 24 separates and extracts application control information (also referred to as an AIT (Application Information Table)) from the broadcasting stream and then outputs the information to the application control unit 30.

The data broadcasting processing unit 25 reads a data broadcasting app described in, for example, BML (Broadcast Markup Language), JAVA (a registered trademark), or the like from a data broadcast signal, and then outputs the result to the data broadcasting engine 26. The data broadcasting engine 26 executes the data broadcasting app described in the BML, or the like using a built-in BML browser, or the like. The executed data broadcasting app outputs a video signal of a data broadcast to the video output unit 33 and outputs an audio signal of the data broadcast to the audio output unit 34. In addition, the executed data broadcasting app can control the application control unit 30 such that a link app is activated.

The video decoder 27 decodes the encoded video data, and then outputs video signals of the program obtained from the result to the video output unit 33. The audio decoder 28 decodes the encoded audio data, and then outputs audio signals of the program obtained from the result to the audio output unit 34. The subtitle decoder 29 decodes the encoded subtitle data, and then outputs subtitle signals of the program obtained from the result to the video output unit 33.

The application control unit 30 analyzes the application control information (AIT) input from the demultiplexer 24, and then controls the application engine 32 based on the analysis result. In addition, the application control unit 30 controls the IP communication I/F 31 such that the application control information (AIT) is acquired from a predetermined server (for example, the communication device 13) via the IP communication network 14, analyzes the information, and then controls the application engine 32 based on the analysis result. The IP communication I/F 31 communicates with the predetermined server (for example, the communication device 13) via the IP communication network 14.

The application engine 32 accesses the communication device 13 via the IP communication I/F 31 and the EP communication network 14 according to control of the application control unit 30, and then acquires and executes the link app described in HTML5, or the like. In addition, the application engine 32 outputs a video signal output from the link app to the video output unit 33, and an audio signal to the audio output unit 34. Note that the application engine 32 can also execute general applications (for example, an Internet browser) different from a link application.

The video output unit 33 selects or combines the video signals input from each unit and then outputs them to a later stage. The audio output unit 34 selects or combines the audio signals input from each unit and then output to a later stage.

The operation input unit 35 receives various operation inputs from a user, and then outputs the operation signals to the control unit 36. The control unit 36 controls each unit of the reception device 20 based on the operation signals.

[Explanation of an Overview of Operations]

Next, an overview of two operations performed by the link application control system 10 will be described.

Figure 3:
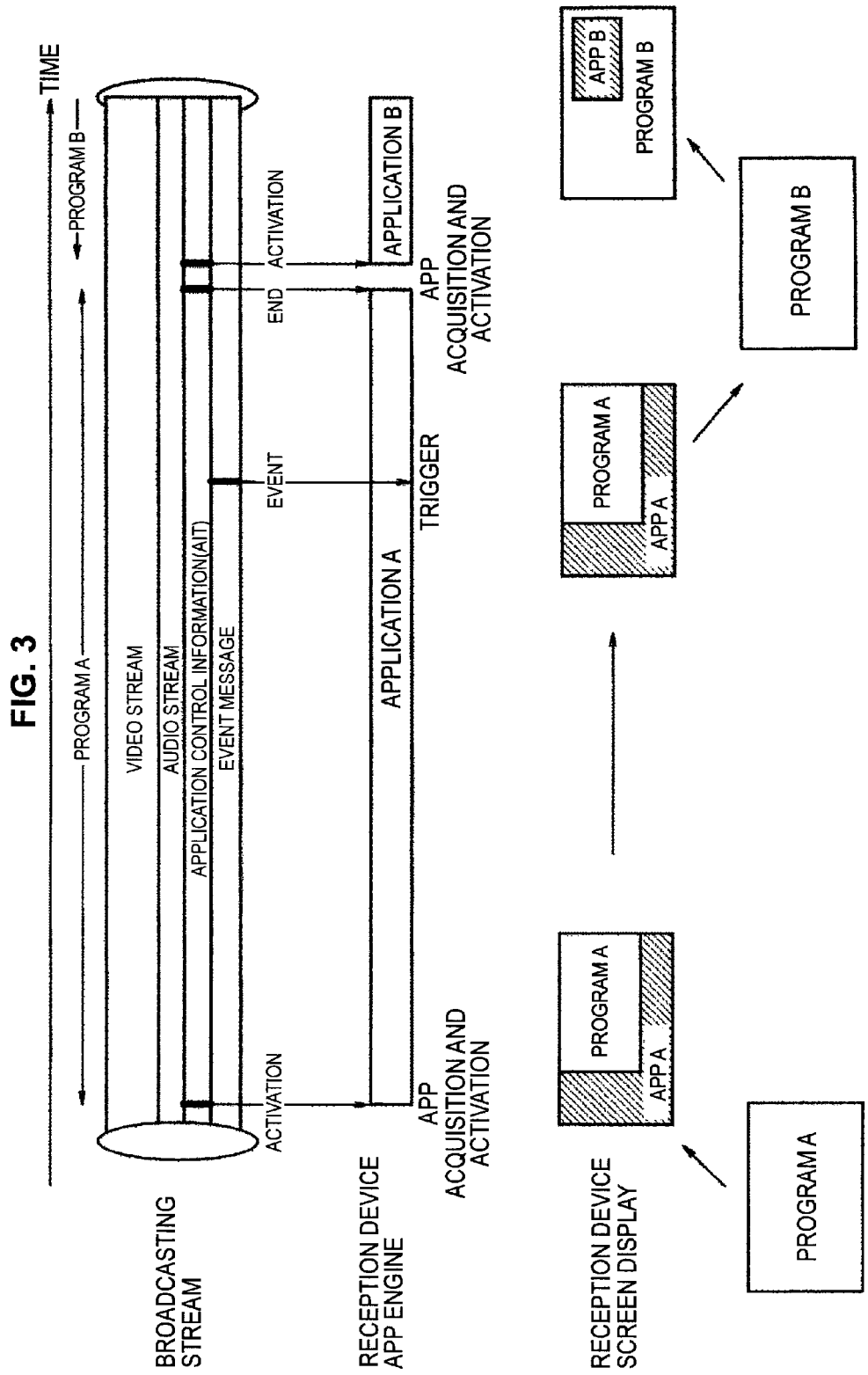
FIG. 3 is a diagram for describing an overview of an operation of a broadcasting-oriented link application.

FIG. 3 shows an overview of an operation of a broadcasting-oriented link application. The broadcasting-oriented link application is a link app acquired and activated by the reception device 20 based on the application control information (AIT) included in a broadcasting stream. Note that the application control information (AIT) may be broadcast as a stream different from a video stream or an audio stream, or may be broadcast by being embedded in a video stream or an audio stream, as illustrated in the drawing.

To be specific, as illustrated in the drawing, for example, when the reception device 20 receives the application control information (AIT) broadcast with a program A, the reception device 20 acquires a link app A from the communication device 13 and activates the app based on the information. The same AIT that includes items serving as triggers for activating the link app is consecutively broadcast a plurality of times in preparation for a reception error, or the like made by the reception side.

The activated link app A can display the program A as a slave screen by providing, for example, a display region for the program A in a video of the link app A. In addition, by an event message triggering an event, for example, a video of the link app A can be changed. In addition, the link app A is closed at the same time as an end of the program A (the link app A can also be continuously activated without closing).

When a program B starts after the program A, a link app B is activated in the same manner as in the case of the program A. Note that there are cases in which closing of the link app A occurs simultaneously with activation of the link app B. The activated link app B may be displayed within a video of the program B displayed over an entire screen by, for example, providing a slave screen for the link app B. The link app B is closed at the same time as an end of the program B (the link app B can also be continuously activated without closing).

Figure 4:
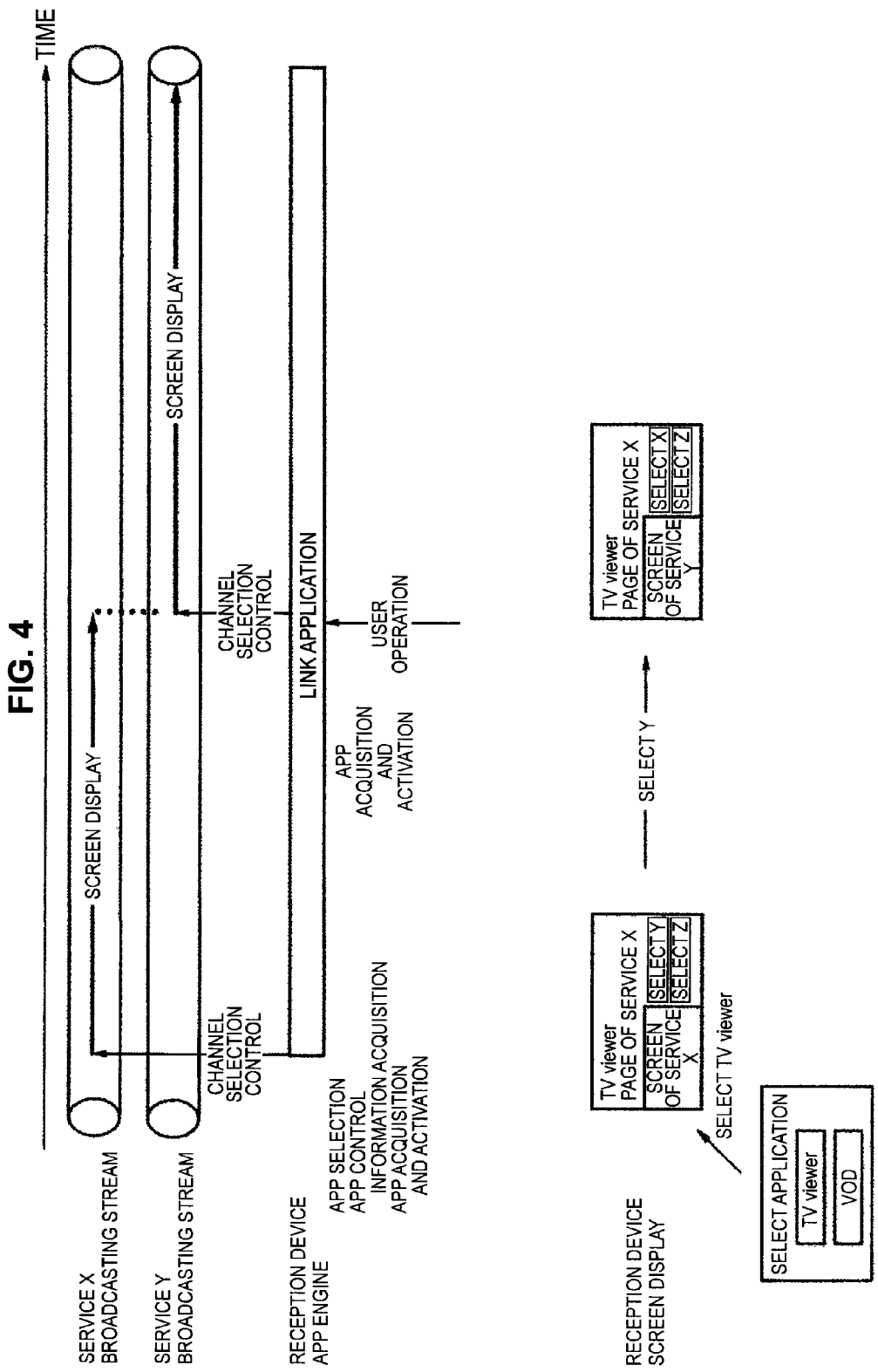
FIG. 4 is a diagram for describing an overview of an operation of a non-broadcasting-oriented link application.

Next, FIG. 4 expresses an overview of an application of a non-broadcasting-oriented link application. The non-broadcasting-oriented link application is a link app activated by the reception device 20 according to an operation input by a user.

For example, the reception device 20 is set to be a device that can display an application launcher that causes a user to select an application to be executed from a plurality of executable applications. In the case of the drawing, in the application launcher, "TV viewer" which is a link application that enables viewing of television programs and "VOD (video on demand)" which is an app that enables viewing of content transmitted via the IP communication network 14 can be selected. When a user makes a selection operation for the "TV viewer" in the application launcher, the reception device 20 accesses a predetermined URL (which is set to indicate the communication device 13 in this case) associated in advance with the "TV viewer" and acquires an AIT corresponding to the link app "TV viewer."

The reception device 20 that has acquired the AIT acquires the link app "TV viewer" from the communication device 13 and activates the app only when the reception device analyzes the AIT and then confirms the reliability (for example, when a given electronic signature can pass signature verification). Note that the link app "TV viewer" can be set to be retained in the reception device 20 in advance.

The activated link app "TV viewer" controls the television broadcasting reception system of the reception device 20 such that selection of a received service (or a channel) can be controlled. In addition, a button for selecting a channel serving as a user interface can be displayed within a video of the link app "TV viewer." When, for example, a service (or a channel) X is selected first and then a service (or a channel) Y is selected according to an operation of a user on an output screen of the link app "TV viewer," a program broadcast in the service X is first displayed and then a program broadcast in the service Y is displayed in a program display region of the app.

[Regarding State Transition of the Reception Device 20]

Figure 5:
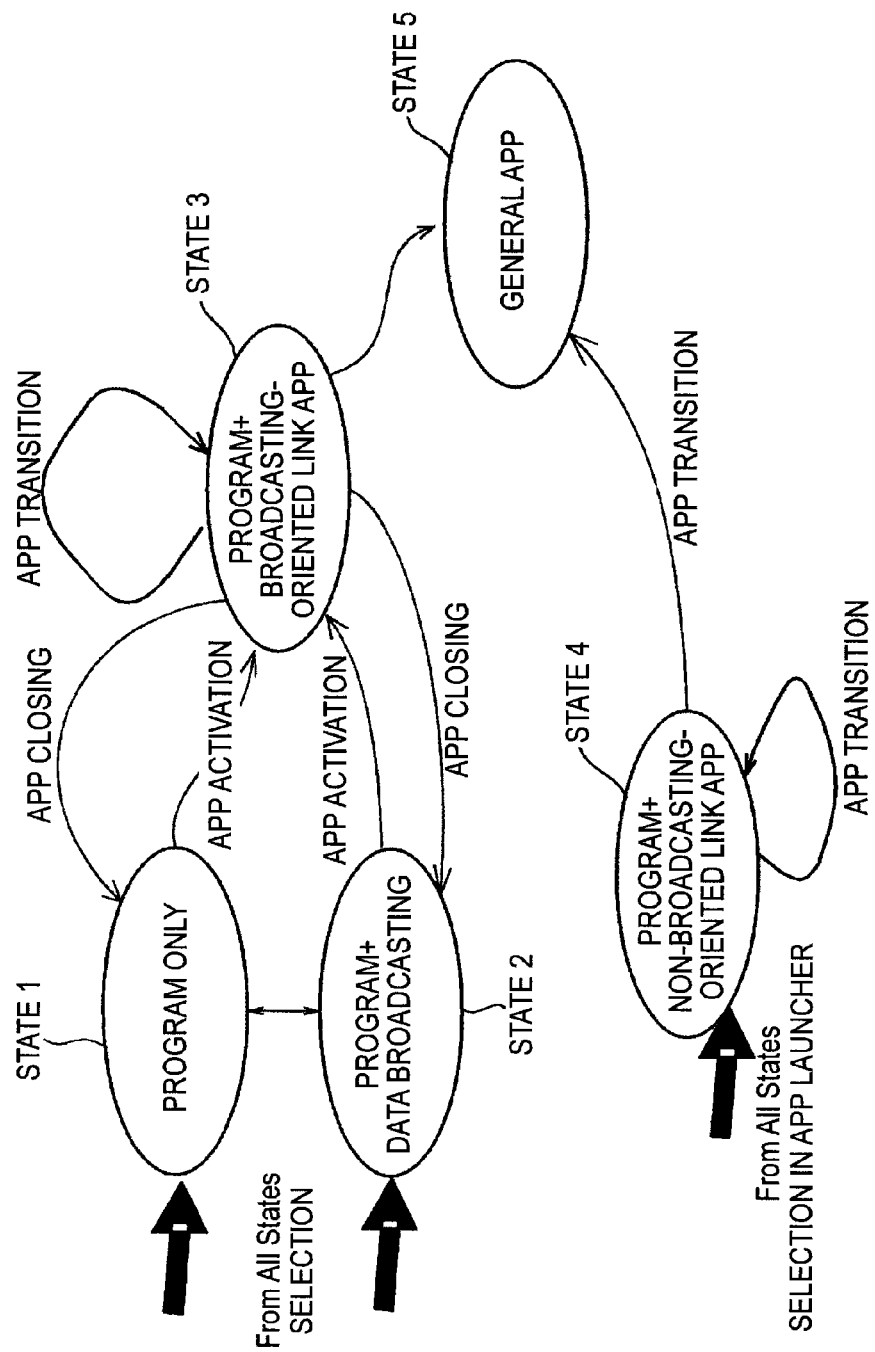
FIG. 5 is a diagram illustrating state transition of display of the reception device.

FIG. 5 illustrates state transition of display of the reception device 20.

There are five states of display of the reception device 20 as illustrated in the drawing.

State 1 is a state in which a broadcast program is received and displayed. State 2 is a state in which a broadcast program and a data broadcast are received and the program and the data broadcast are displayed at the same time. State 3 is a state in which a broadcast program and a video of a broadcasting-oriented link app are combined and displayed. State 4 is a state in which a broadcast program and a video of a non-broadcasting-oriented link app are combined and displayed. State 5 is a state in which a video of a general app different from the broadcasting-oriented link app and the non-broadcasting-oriented link app is displayed.

State 1 can transition to any other state when an operation of selecting a television broadcast is performed. State 1 can transition to State 2 when a data broadcast is additionally received. State 1 can transition to State 3 when the broadcasting-oriented link app is activated.

State 2 can transition to any other state when an operation of selecting a television broadcast is performed. State 1 can transition to State 1 when a data broadcast is stopped. State 2 can transition to State 3 when the broadcasting-oriented link app is activated.

In State 3, the broadcasting-oriented link app can be switched (transition of the broadcasting-oriented link app). State 3 can transition to State 1 or State 2 when the executed broadcasting-oriented link app is closed. State 3 can transition to State 5 when a user, for example, selects a hyperlink such as a banner advertisement.

State 4 can transition to any other state when a non-broadcasting-oriented link app is selected in the application launcher. In State 4, the non-broadcasting-oriented link app can be switched (transition of the non-broadcasting-oriented link app). State 4 can transition to State 5 when a user, for example, selects a hyperlink such as a banner advertisement.

Note that, after transitioning to State 5, it is not possible to transition to State 1 to State 4. In order to return to State 1 to State 4, it is necessary to close the executed general app.

[Regarding the Application Control Information (AIT)]

Next, FIG. 6 illustrates items included in the application control information.

The application control information 50 includes an application type 51, a provider ID 52, an application ID 53, an application control command 54, and an application specification version 55 as essential items.

In addition, the application control information 50 can include a reception device required function profile 56, an application URL 57, an application boundary 58, application system priority 59, an application-broadcasting linkage range 60, permission information 61, and a server access distribution parameter 62 as optional items (which may be essential according to a command).

The application type 51 is information indicating a type (description language) of a corresponding link app. The provider ID 52 is identification information of an application provider who creates a corresponding link app. The application ID 53 is unique identification information of a specific provider of a corresponding link app.

The application control command 54 is information indicating a control action to a corresponding link app, which corresponds to any of four command types of automatic activation, prefetching, closing, and operable. Automatic activation means acquisition (when not yet acquired) and activation of a corresponding link app. Prefetching means pre-acquisition of a corresponding link app. Closing means closing of a corresponding link app. Operable means permission for execution of a corresponding link app when the corresponding AIT is acquired.

The application specification version 55 is information indicating a version number of each application type (description language).

The reception device required function profile 56 is a profile value indicating a function required to the reception device 20 (for example, including a storage therein, or the like) at the time of executing a corresponding link app. The reception device 20 can activate the corresponding link app only when the device has the function indicated by the profile value.

The application URL 57 is a URL (Uniform Resource Locator) indicating an acquisition source (the communication device 13 in the present embodiment) of a corresponding link app. The application boundary 58 is information indicating a range in which a corresponding link app is linked with a TV broadcast. The application system priority 59 is information indicating priority of activation when there are overlapping applications (including data broadcasting) which are set to be automatically activated. The application-broadcasting linkage range 60 is information indicating a range in which an executed link app is not closed but continuously executed (link operation range).

The permission information 61 is information for controlling the reception device control function with respect to a corresponding link app. Here, the reception device control function means deciding a layout of a screen output by the reception device 20, referring to metadata of a program, or controlling an operation (for example, channel selection, or the like) relating to reception of the reception device 20. The permission information 61 will be described in more detail with reference to FIGS. 7 and 8.

The server access distribution parameter 62 is a control parameter for temporal-dividing of access to a server (the communication device 13 in this case) that is an acquisition source of a corresponding link app.

[Bitmap of the Permission Information 61]

FIG. 7 illustrates a bitmap of the permission information 61.

The permission information 61 is constituted by 8 bits, and leftmost 2 bits are for video reference 71, and the remaining bits are for real-time channel selection 72, reserved channel selection 73, SI reference 74, current channel selection information acquisition 75, NVRAM Read 76, and NVRAM Write 77, all of the bits constituting the 8 bits.

The video reference 71 of 2 bits relates to a layout of a video of a program on a screen, indicating a range of the layout permitted to a link app. Details thereof are shown in FIG. 8.

As shown in FIG. 8, the video reference 71 of 2 bits is set to be 00, 01, 10, or 11.

For a broadcasting-oriented link app, the video reference 71 is not set to be 00 (setting itself is not permitted). When the video reference 71 is set to be 00 for a non-broadcasting-oriented link app, it means that referring to (or citing) information obtained from broadcasting is not permitted.

When video reference 71 is set to be 01 for a broadcasting-oriented link app, it means that a state in which a video of a program is displayed on the entire screen and a video of the link app is not displayed is permitted.

When the video reference 71 is set to be 01 for a non-broadcasting-oriented link app, it means that a state in which a video of a program is displayed on the entire screen and a video of the link app is not displayed, or in which information obtained from broadcasting should not be referred to is permitted.

When the video reference 71 is set to be 10 for a broadcasting-oriented link app, it means that a state in which a video of a program is displayed as a slave screen within a video of the link app is permitted.

When the video reference 71 is set to be 10 for a non-broadcasting-oriented link app, it means that a state in which a video of a program is displayed as a slave screen within a video of the link app or in which information obtained from broadcasting should not be referred to is permitted.

When the video reference 71 is set to be 11 for a broadcasting-oriented link app, it means that a state in which a video of a program is displayed as a slave screen within a video of the link app and a state in which a video of the link app is displayed so as to overlap a video of the program are permitted.

When the video reference 71 is set to be 10 for a non-broadcasting-oriented link app, it means that a state in which a video of a program is displayed as a slave screen within a video of the link app, a state in which a video of the link app is displayed so as to overlap a video of the program, or in which information obtained from broadcasting should not be referred to are permitted.

Returning to FIG. 7, the real-time channel selection 72 of 1 bit indicates whether or not a link app is permitted to select a channel (change a channel) in real-time. The reserved channel selection 73 of 1 bit indicates whether or not a link app is permitted to perform reserved channel selection (including recording reservation).

The SI reference 74 of 1 bit indicates whether or not a link app is permitted to refer to SI (Service Information) included in a broadcasting stream. The current channel selection information acquisition 75 of 1 bit indicates whether or not acquisition of information (Network ID, or the like) indicating a service (channel) currently selected by the reception device 20 is to be permitted.

The NVRAM Read 76 of 1 bit indicates whether or not reading of information from a non-volatile memory installed in the reception device 20 is permitted. The NVRAM Write 77 of 1 bit indicates whether or not writing of information on the non-volatile memory installed in the reception device 20 is permitted.

[Explanation of a Link Application Execution Process]

Figure 9:
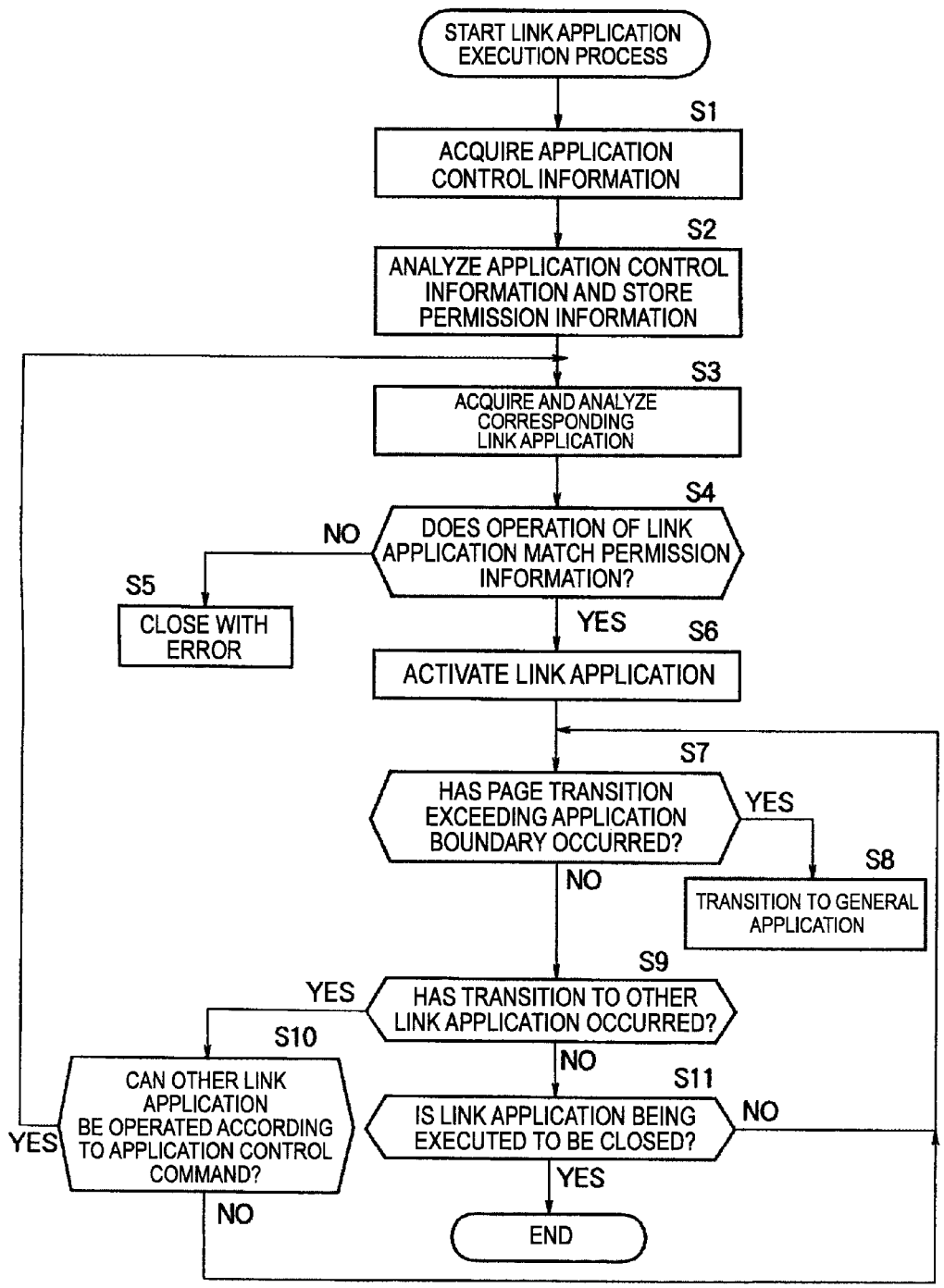
FIG. 9 is a flowchart for describing a link application execution process.

Next, FIG. 9 is a flowchart for describing a link application execution process performed by the reception device 20.

The link application execution process is started as a pre-process performed when a broadcasting-oriented link app is activated according to the fact that the application control command 54 of the application control information (AIT) 50 received together with a program by the reception device 20 is of automatic activation. Note that the reception device 20 is assumed to receive a latest AIT 50 at all times while receiving a program.

The application control unit 30 acquires the latest AIT 50 from the demultiplexer 24 in Step S1, and analyzes the AIT 50 and stores the permission information 61 included therein in Step S2.

In Step S3, the application control unit 30 controls the IP communication I/F 31 based on the application URL 57 of the AIT 50 such that a corresponding broadcasting-oriented link app is acquired from the communication device 13, and then supplies the broadcasting-oriented link app to the application engine 32. Note that, when the corresponding broadcasting-oriented link app is already acquired, Step S3 can be skipped.

In Step S4, the application control unit 30 analyzes description content (programmed content) described in HTML5, or the like of the broadcasting-oriented link app supplied to the application engine 32, and determines whether or not an operation of the content matches the content permitted in the permission information 61 of the AIT 50. When the determination result is negative, the corresponding broadcasting-oriented link app attempts to control the reception device 20 in a range that is not permitted in the permission information 61, and there is a possibility of the app being created by an app provider with ill intention or having a bug in the app program. Thus, in such a case, the process proceeds to Step S5, and the link application execution process is closed with an error without activating the corresponding broadcasting-oriented link app.

When the determination result of Step S4 is positive, the process proceeds to Step S6, and the application engine 32 activates the broadcasting-oriented link app according to control of the application control unit 30. Accordingly, the reception device 20 transitions to State 3 of FIG. 5.

After the corresponding broadcasting-oriented link app is activated, the application control unit 30 determines whether or not page transition exceeding the operation range indicated in the application boundary 58 of the AIT 50 has occurred by the broadcasting-oriented link app being executed by the application engine 32 in Step S7. When the determination result is positive, the process proceeds to Step S8, the broadcasting-oriented link app being executed is closed, an Internet browser, or the like is activated by a general app, and then a page of a transition destination is displayed by the Internet browser, or the like. Accordingly, the reception device 20 transitions to State 5 of FIG. 5.

When the determination result of Step S7 is negative, the process proceeds to Step S9. In Step S9, the application control unit 30 determines whether or not transition to another broadcasting-oriented link app has occurred by the broadcasting-oriented link app being executed. When the determination result is positive, the process proceeds to Step S10. In Step S10, the application control unit 30 determines whether or not the broadcasting-oriented link app which is a transition destination is currently operable, referring to the application control command 54 of the latest AIT 50. When the determination result is positive, the process returns to Step S3, and a process for activating the broadcasting-oriented link app that is the transition destination is performed. On the other hand, when the determination result of Step S10 is negative, the broadcasting-oriented link app that is the transition destination is not activated, then the process returns to Step S7, and the step and the following steps are repeated.

When the determination result of Step S9 is negative, the process proceeds to Step S11. In Step S11, the application control unit 30 determines whether or not the broadcasting-oriented link app being executed by the application engine 32 is to be closed. When the determination result is negative, the process returns to Step S7, and the step and the following steps are repeated. On the other hand, when the determination result of Step S11 is positive based on, for example, the application control command 54 of the latest AIT 50 of closing, the broadcasting-oriented link app being executed by the application engine 32 is closed, and accordingly, the link application execution process is also closed.

According to the link application execution process described above, activation of a broadcasting-oriented link app can be restricted based on the permission information 61 of the AIT 50. In other words, the reception device control function of an activated broadcasting-oriented link app can be controlled by a broadcasting side in stages.

Note that the link application execution process described above is executed in the same manner as a pre-process performed when a non-broadcasting-oriented link application is activated in the reception device 20. However, a supply source of the AIT 50 is changed to a predetermined server in that case. Thus, as long as only a formal AIT 50 authorized by the broadcasting side is set to be supplied to the reception device 20, the reception device control function of a non-broadcasting-oriented link application can be controlled by the broadcasting side in stages.

The above-described series of processing may be performed by hardware or may be performed by software. When the series of processing is performed by software, a program forming the software is installed into a computer that is incorporated in a dedicated hardware, or installed from a program storage medium into a general-purpose personal computer, for example, that can perform various types of functions by installing various types of programs.

Figure 10:
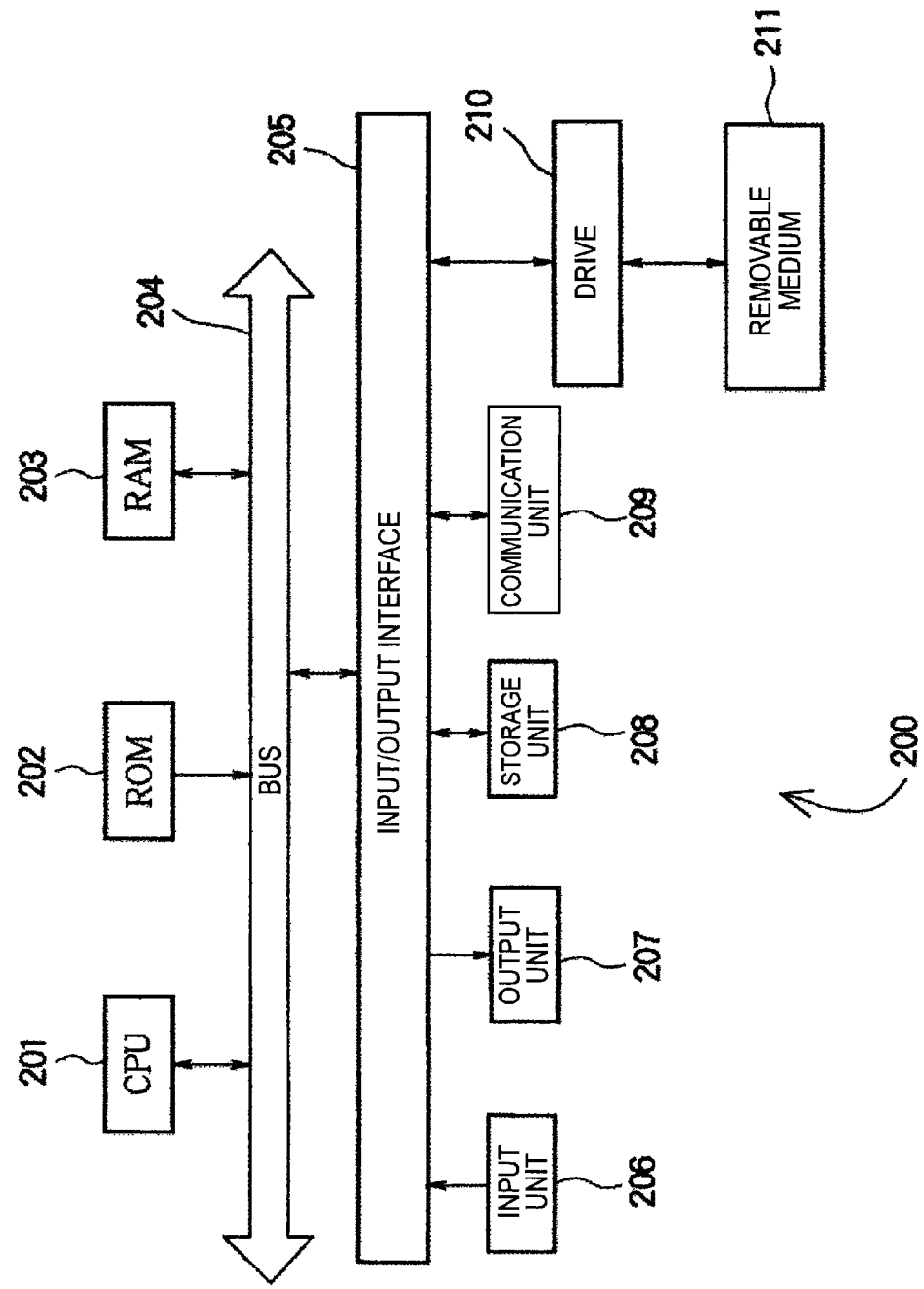
FIG. 10 is a block diagram illustrating a configuration example of a computer.

FIG. 10 is a block diagram showing a hardware configuration example of a computer that performs the above-described series of processing using a program.

In the computer 200, a central processing unit (CPU) 201, a read only memory (ROM) 202 and a random access memory (RAM) 203 are mutually connected by a bus 204.

Further, an input/output interface 905 is connected to the bus 204. Connected to the input/output interface 205 are an input unit 206 formed by a keyboard, a mouse, a microphone and the like, an output unit 207 formed by a display, a speaker and the like, a storage unit 208 formed by a hard disk, a nonvolatile memory and the like, a communication unit 209 formed by a network interface and the like, and a drive 210 that drives a removable medium 211 that is a magnetic disk, an optical disk, a magneto-optical disk, or a semiconductor memory etc.

In the computer configured as described above, the CPU 201 loads a program that is stored, for example, in the storage unit 208 onto the RAM 203 via the input/output interface 205 and the bus 204, and executes the program. Thus, the above-described series of processing is performed.

Note that the program executed by the computer may be a program in which processes are carried out in a time series in the order described in this specification or may be a program in which processes are carried out in parallel or at necessary timing, such as when the processes are called.

The program may be processed by one computer or by a plurality of computers in a distributed manner. Further, the program may be performed after being transferred to a remote computer.

In addition, the system in the specification includes a plurality of apparatuses, and represents the entirety thereof.

The embodiment of the present disclosure is not limited to the above-described embodiment. It should be understood by those skilled in the art that various modifications, combinations, sub-combinations and alterations may occur depending on design requirements and other factors insofar as they are within the scope of the appended claims or the equivalents thereof.

REFERENCE SIGNS LIST 10 link application control system
11 broadcasting device
12 broadcasting network
13 communication device
14 IP communication network
20 reception device
21 broadcasting tuner
22 descrambler
23 CAS module
24 demultiplexer
25 data broadcasting processing unit
26 data broadcasting engine
27 video decoder
28 audio decoder
29 subtitle decoder
30 application control unit
31 IP communication I/F 32 application engine
33 video output unit
34 audio output unit
35 operation input unit
36 control unit
50 application control information (AIT)
61 permission information
71 video reference
72 real-time channel selection
73 reserved channel selection
74 SI reference
75 current channel selection information acquisition
76 NVRAM Read
77 NVRAM

The invention claimed is:

1. A reception device, comprising:
at least one processor configured to:
receive first content broadcasted via a broadcasting network;
execute a link application configured to change a layout of a screen with reference to a video of the first content;
control the execution of the link application based on application control information related to the link application such that activation of the link application is restricted,
wherein the application control information comprises permission information that includes a plurality of bits,
wherein a value of a first bit of the plurality of bits and a value of a second bit of the plurality of bits are associated with the layout of the screen,
wherein the second bit is subsequent to the first bit, and wherein remaining bits of the plurality of bits are related to at least NVRAM Read; and
set one of a plurality of display states of second content of the link application on the layout of the screen, based on the value of the first bit and the value of the second bit.

2. The reception device according to claim 1,
wherein the at least one processor is further configured to:
analyze an operation of the link application yet to be activated;
control the execution of the link application based on a comparison of the operation of the link application to the permission information; and
restrict the activation of the link application based on the comparison.

3. The reception device according to claim 2,
wherein the at least one processor is further configured to acquire the application control information from a server.

4. The reception device according to claim 2,
wherein the remaining bits of the plurality of bits of the permission information are related to at least one of real-time channel selection, reserved channel selection, Service Information (SI) reference, current channel selection information acquisition, or NVRAM Write.

5. The reception device according to claim 4,
wherein the reserved channel selection indicates at least a permission to record reservation by the link application.

6. The reception device according to claim 4,
wherein the current channel selection information acquisition indicates at least a permission to acquire information indicating a service channel currently selected by the reception device.

7. The reception device according to claim 1,
wherein the plurality of display states of the second content of the link application includes:
a first display state in which a display of the second content is prohibited;
a second display state in which a display of the first content is within the display of the second content; and
a third display state in which the display of the second content overlaps the display of the first content.

8. The reception device according to claim 1,
wherein the link application is one of a broadcast-oriented link application or a non-broadcast oriented link application,
wherein the broadcast-oriented link application is activated by the reception device based on the application control information included in a broadcast stream, and
wherein the non-broadcast oriented link application is activated by the reception device based on a user operation.

9. The reception device according to claim 1, the application control information further comprises at least one of an application-broadcasting linkage range or a server access distribution parameter.

10. A reception method, comprising:
in a reception device configured to receive first content broadcasted via a broadcasting network:
acquiring application control information relating to a link application, wherein the link application is configured to change a layout of a screen with reference to a video of the first content; and
controlling execution of the link application by restricting activation of the link application based on the application control information,
wherein the application control information comprises permission information that includes a plurality of bits,
wherein a value of a first bit of the plurality of bits and a value of a second bit of the plurality of bits are associated with the layout of the screen,
wherein the second bit is subsequent to the first bit, wherein remaining bits of the plurality of bits are related to at least NVRAM Read, and
wherein one of a plurality of display states of second content of the link application is set on the layout of the screen based on the value of the first bit and the value of the second bit.

11. A non-transitory computer-readable medium having stored thereon computer-executable instructions that, when executed by a processor, cause the processor to execute operations, the operations comprising:
in a reception device configured to receive first content broadcasted via a broadcasting network:
executing a link application configured to change a layout of a screen with reference to a video of first content; and
controlling the execution of the link application based on application control information relating to the link application such that activation of the link application is restricted,
wherein the application control information comprises permission information that includes a plurality of bits,
wherein a value of a first bit of the plurality of bits and a value of a second bit of the plurality of bits are associated with the layout of the screen, wherein the second bit is subsequent to the first bit, wherein remaining bits of the plurality of bits are related to at least NVRAM Read, and wherein one of a plurality of display states of second content of the link application is set on the layout of the screen based on the value of the first bit and the value of the second bit.

12. A broadcasting device, comprising:

at least one processor configured to:

broadcast first content via a broadcasting network; and supply, to a reception device, application control information related to a link application, wherein the link application is executed with reception of the first content by the reception device and the link application changes a layout of a screen with reference to a video of the first content, wherein the execution of the link application is controlled based on the application control information related to the link application, wherein the application control information comprises permission information that includes a plurality of bits, wherein a value of a first bit of the plurality of bits and a value of a second bit of the plurality of bits are associated with related to the layout of the screen, wherein the second bit is subsequent to the first bit, wherein remaining bits of the plurality of bits are related to at least NVRAM Read, and wherein one of a plurality of display states of second content of the link application is set on the layout of the screen based on the value of the first bit and the value of the second bit.

13. The broadcasting device according to claim 12, wherein the remaining bits of the plurality of bits of the permission information are related to real-time channel selection, reserved channel selection, Service Information (SI) reference, current channel selection information acquisition, or NVRAM Write.

14. A broadcasting method, comprising:

in a broadcasting device that broadcasts first content via a broadcasting network:

supplying, to a reception device, application control information relating to a link application, wherein the link application is executed with reception of the first content by the reception device and the link application changes a layout of a screen with reference to a video of the first content, wherein the execution of the link application is controlled based on the application control information relating to the link application, wherein the application control information comprises permission information that includes a plurality of bits, wherein a value of a first bit of the plurality of bits and a value of a second bit of the plurality of bits are associated with related to the layout of the screen, wherein the second bit is subsequent to the first bit, wherein remaining bits of the plurality of bits are related to at least NVRAM Read, and wherein one of a plurality of display states of second content of the link application is set on the layout of the screen based on the value of the first bit and the value of the second bit.

15. A non-transitory computer readable medium having stored thereon computer-executable instructions that, when executed by a processor, cause the processor to execute operations, the operations comprising:

in a broadcasting device that broadcasts first content via a broadcasting network:

supplying, to a reception device, application control information relating to a link application, wherein the link application is executed with reception of the first content by the reception device and the link application changes a layout of a screen with reference to a video of the first content, wherein the execution of the link application is controlled based on the application control information relating to the link application, wherein the application control information comprises permission information that includes a plurality of bits, wherein a value of a first bit of the plurality of bits and a value of a second bit of the plurality of bits are associated with the layout of the screen, wherein the second bit is subsequent to the first bit, wherein remaining bits of the plurality of bits are related to at least NVRAM Read, and wherein one of a plurality of display states of second content of the link application is set on the layout of the screen based on the value of the first bit and the value of the second bit.

16. A link application control system, comprising:

a broadcasting device configured to broadcast first content via a broadcasting network; and a reception device configured to:

receive the first content, wherein the broadcasting device is configured to supply, to the reception device, application control information related to a link application, wherein the link application is executed together with reception of the first content by the reception device;

execute the link application to change a layout of a screen with reference to a video of the first content;

control the execution of the link application based on the application control information such that activation of the link application is restricted, wherein the application control information comprises permission information that includes a plurality of bits, wherein a value of a first bit of the plurality of bits and a value of a second bit of the plurality of bits are associated with the layout of the screen, wherein the second bit is subsequent to the first bit, and wherein remaining bits of the plurality of bits are related to at least NVRAM Read; and set one of a plurality of display states of second content of the link application on the layout of the screen based on the value of the first bit and the value of the second bit.

* * * * *